United States Patent
Ham, Jr. et al.

(10) Patent No.: US 6,354,614 B1
(45) Date of Patent: Mar. 12, 2002

(54) LINK ASSEMBLY FOR MOTOR VEHICLE SUSPENSION

(76) Inventors: Donald R. Ham, Jr., 5182 Hampshire Ave., Westminster, CA (US) 92683; Jarret M. Ewanek, 2209 Carnegie La. #4, Redondo Beach, CA (US) 90278

( * ) Notice: Subject to any disclaimer, the term of this patent is extended or adjusted under 35 U.S.C. 154(b) by 0 days.

(21) Appl. No.: 09/414,115

(22) Filed: Oct. 8, 1999

(51) Int. Cl.[7] ................................................ B60G 1/04
(52) U.S. Cl. ....................... 280/124.11; 280/124.116; 384/291; 267/293
(58) Field of Search .................. 280/124.128, 124.156, 280/124.11, 124.111, 124.116, 86.75, 403, 464; 403/28, 225; 464/89; 384/291; 267/273, 279, 281, 282, 293

(56) References Cited

U.S. PATENT DOCUMENTS

| | | | |
|---|---|---|---|
| 3,807,752 A | * 4/1974 | Mauck | 280/81 R |
| 4,537,420 A | * 8/1985 | Ito et al. | 280/661 |
| 4,765,647 A | * 8/1988 | Kondo et al. | 280/701 |
| 5,562,348 A | * 10/1996 | Link | 384/474 |
| 5,836,699 A | * 11/1998 | Back et al. | 384/276 |
| 5,895,063 A | * 4/1999 | Hasshi et al. | 280/124.134 |
| 5,897,107 A | * 4/1999 | Zierden et al. | 267/267 |
| 5,946,980 A | * 9/1999 | Raza et al. | 74/579 R |
| 6,092,819 A | * 7/2000 | Overby et al. | 280/124.153 |
| 6,095,563 A | * 8/2000 | Bushek | 280/788 |
| 6,213,904 B1 | * 4/2001 | Tanaka et al. | 474/91 |

FOREIGN PATENT DOCUMENTS

| | | | | |
|---|---|---|---|---|
| DE | 3840114 A1 | * 6/1990 | | B60G/3/00 |
| EP | 0083234 A2 | * 7/1983 | | B60G/3/20 |

OTHER PUBLICATIONS

Rancho Catalog 1998, pp. 5–7.

* cited by examiner

*Primary Examiner*—Lanna Mai
*Assistant Examiner*—Christopher Buchanan
(74) *Attorney, Agent, or Firm*—Harness, Dickey & Pierce, PLC

(57) ABSTRACT

A link assembly for a suspension system of a motor vehicle. The link assembly includes a link having a barrel portion at each end. The barrel portion is narrower than that of previously developed links and is fitted with tapered cone bushings. The narrower links and tapered cone bushings enable a greater degree of articulation of the link without the edges of the barrel portions hitting the surfaces of the mounting brackets to which the link is attached. Each barrel portion also includes an integral ring which limits the lateral movement of each link assembly without limiting torsional movement. Each barrel portion also includes integrally formed grease passageways for enabling lubricant to be held within the barrel portions when the tapered cone bushings are assembled thereto.

11 Claims, 3 Drawing Sheets

LINK ASSEMBLY FOR MOTOR VEHICLE SUSPENSION

TECHNICAL FIELD

This invention relates to suspension systems for motor vehicles, and more particularly to a new links assembly for a motor vehicle suspension system which provides for a higher degree of articulation of the original equipment manufacturers suspension while maintaining the original "ride and feel" of the vehicle.

BACKGROUND

It has been increasingly popular to modify the suspension system of a motor vehicle to provide for increased suspension performance. Many such aftermarket kits are available for replacing various suspension components with modified components which enhance suspension performance. However, such aftermarket kits often detract from the original "ride and feel" of the vehicle.

With various sport utility vehicles and light trucks which incorporate a four link or similar suspension, each of the upper and/or lower suspension arms (i.e., upper and/or lower links) are coupled between the original equipment manufacturer ("OEM") frame bracket and an OEM axle bracket. Each of the lower links includes a barrel at opposing ends thereof. The barrels typically each include an encapsulated rubber bushing and are secured to the OEM axle bracket with a bolt which extends through the bracket and through the encapsulated rubber bushing held in the barrel. This arrangement allows very little articulation of the barrels of each link because the outer edges of the barrels hit the inside surfaces of their mounting brackets as the link begins to twist. Also, as the link attempts to twist, the rubber bushings in the barrels become compressed and restrictive, thus further inhibiting twisting movement of the link. Thus, this arrangement allows rotation primarily only about the mounting bolt axis.

It would therefore be highly desirable to provide a link assembly for a motor vehicle having a four link suspension system which allows an increased degree of controlled articulation (i.e., twisting) of the link relative to the mounting brackets to which it is mounted. More specifically, it would be highly desirable to provide a link assembly which allows rotation not only about the mounting bolt axis but also longitudinal "twist" about the longitudinal axis of the link, and radial twist about the axis normal to the intersection of the two previously mentioned axes. It would also be highly desirable to provide a link assembly which maintains the original ride and feel of the OEM suspension without compromising durability.

SUMMARY OF THE INVENTION

The present invention relates to a link assembly for use with a four link suspension system of any motor vehicle adapted for on or off-road travel such as, but not limited to, a sport utility vehicle or light truck. The link system includes a link having barrels at each end which are narrower than the barrels of conventional links, and where each link includes a pair of tapered cone bushings which extend outwardly of the edges of the barrel portion. The tapered cone bushings, in connection with the narrower links, enable the link to articulate (i.e., twist) more than a conventional link before the outer edges of the barrel come into contact with the surfaces of the mounting brackets supporting the link. This also helps to maintain the ride and feel of the OEM suspension.

The link assembly of the present invention further includes an internal ring that is built into the barrel portion of each link. The internal ring restricts the lateral movement of the link but does not restrict the torsional freedom of the link. Increased durability results because of the compliant properties of the tapered cone bushings used in each of the barrels of each link. Performance and durability is further enhanced by integrally formed grease passages extending through the internal ring which enable the barrel to be packed with lubricant once the bushings are assembled therein.

The OEM links achieve some additional twist by constructing their connecting member from stamped steel with one side open. This being of thin material, allows some flex in the longitudinal axis. The invention herein allows total longitudinal twist at the ends of the link assembly via a new barrel/busing design. This allows the connecting member to be constructed from much thicker material including rectangular or round tubing, thus significantly increasing the strength of the link assembly. dr

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
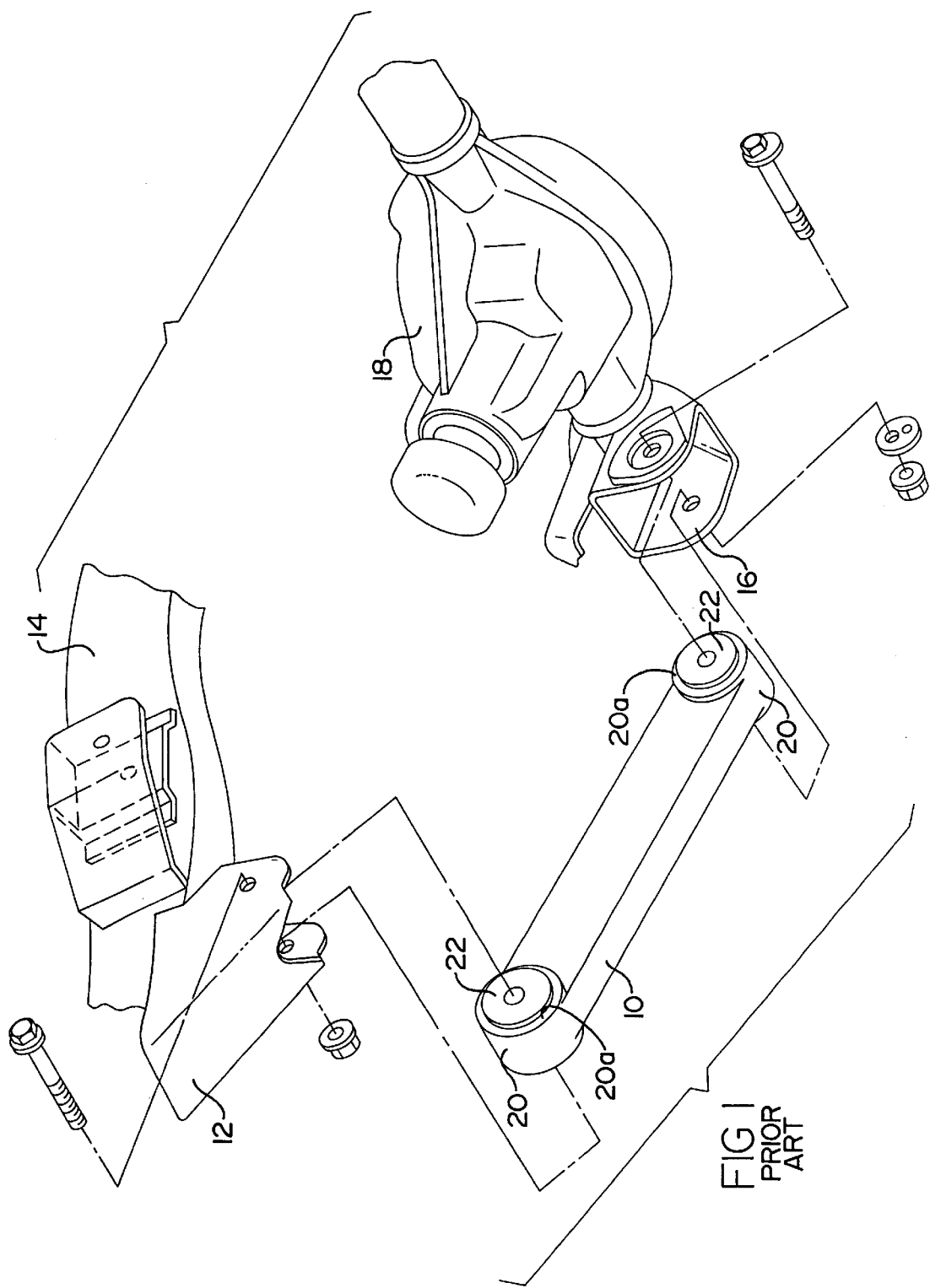
FIG. 1 is a perspective view of a prior art lower link assembly.

Referring to FIG. 1, there is shown a prior art lower link arrangement and surrounding structure to which the link is attached for a motor vehicle suspension system. The link 10 is secured to an OEM frame bracket 12 which is in turn secured to a frame portion 14 of the vehicle at one end of the link and to an OEM axle bracket 16 at the opposite end of the vehicle. The axle bracket 16 is in turn secured to a differential 18 of the vehicle. It will be understood that the vehicle may include eight such links 10, with two such links (i.e., an upper link and a lower link) associated with each wheel of the vehicle, as is well known in the art. At each of the front and rear, two lower links are attached to the differential 18 on opposite sides of the differential, with the opposite end of each link being attached to an associated OEM axle bracket. The upper links are similarly arranged and attached at both the front and rear of the vehicle.

The link 10 includes barrel portions 20 at opposing ends thereof. In each barrel portion is disposed a rubber, single bushing 22 having a molded-in steel sleeve. The bushing 22 is frequently bonded (encapsulated) into its barrel portion. Each bushing 22 receives a bolt therethrough which secures each barrel to its associated mounting bracket. As a result of this construction, the link 10 has only a very limited degree of articulation. Principally, the articulation occurs in one axis only, with the articulation in other axes being negligible. This is because as the link twists, the edges 20a of the barrels 20 quickly come into contact with the surfaces of the mounting brackets 12 and 16 and, along with the compression and resulting restriction of the encapsulated bushing, this limits torsional movement of the link 10. With this arrangement, lateral movement is controlled by virtue of the encapsulated bushings of the link 10.

Figure 2:
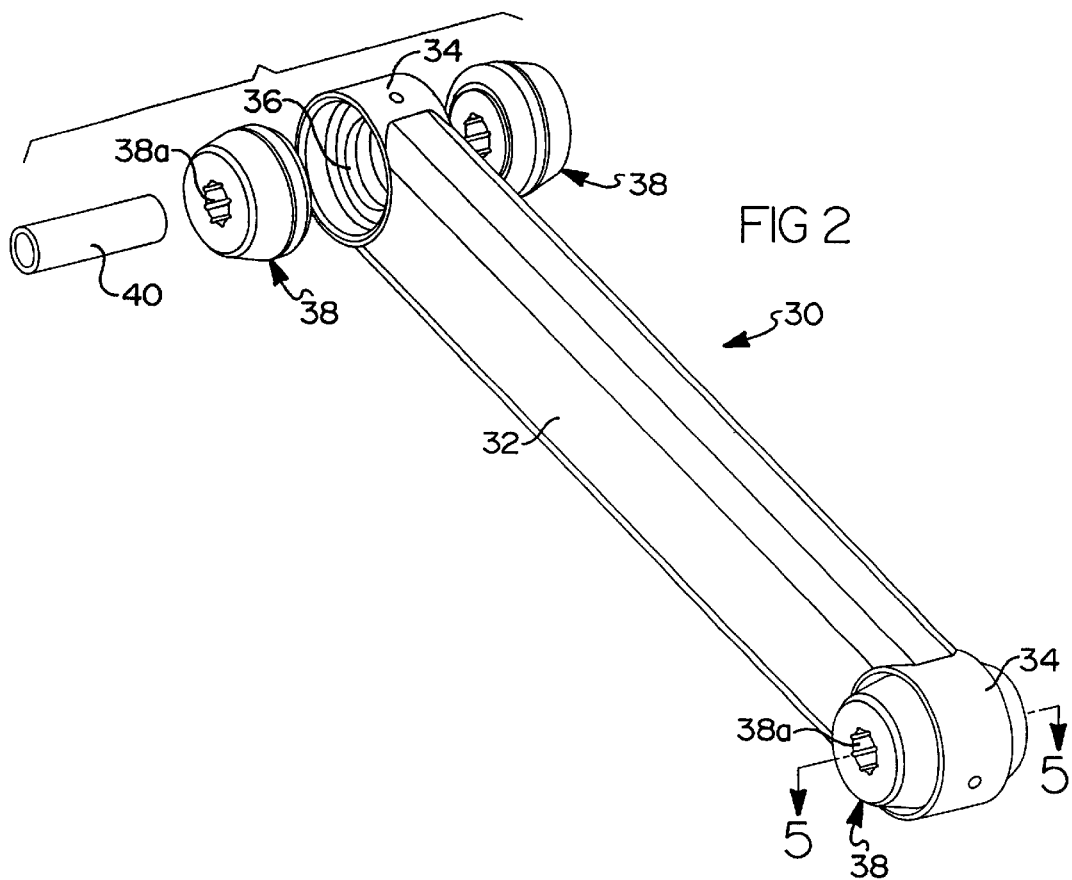
FIG. 2 is a perspective exploded view of the link assembly of the present invention.

Referring now to FIG. 2, a link assembly 30 is shown in accordance with a preferred embodiment of the present invention. The link assembly 30 replaces the link 10 illustrated in FIG. 1.

The link 30 assembly includes a tubular, preferably rectangular main body portion 32 and a barrel portion 34 at each opposing end of the body portion 32. Each barrel 34 includes an integrally formed internal ring 36 which subdivides the barrel into two equal half portions. Inserted into each half portion is a tapered cone bushing 38. A sleeve 40 extends through the openings 38a in each bushing 38 and receives a bolt (not shown) for securing the link 30 to its associated mounting bracket.

Figure 3:
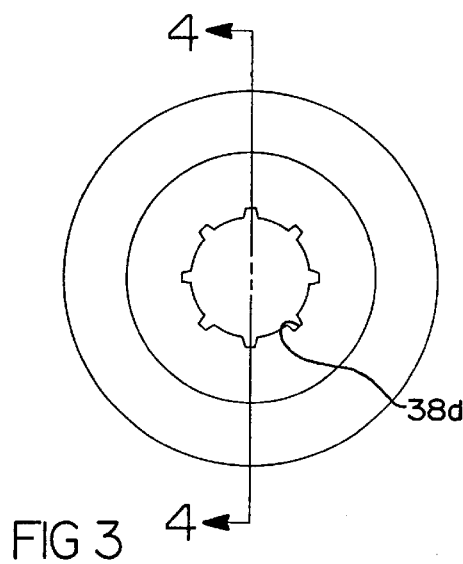
FIG. 3 is front view of one tapered cone bushing shown in FIG. 2.
Figure 4:
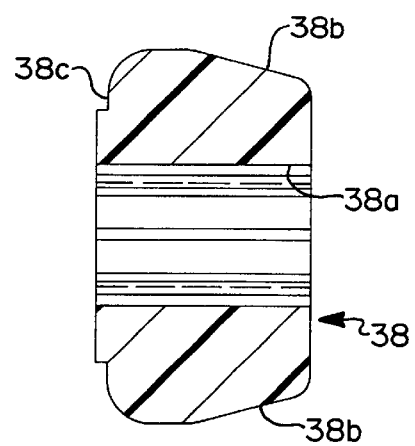
FIG. 4 is a side cross-sectional view of the bushing of FIG. 3 taken in accordance with the section line 4—4 in FIG. 3.
Figure 5:
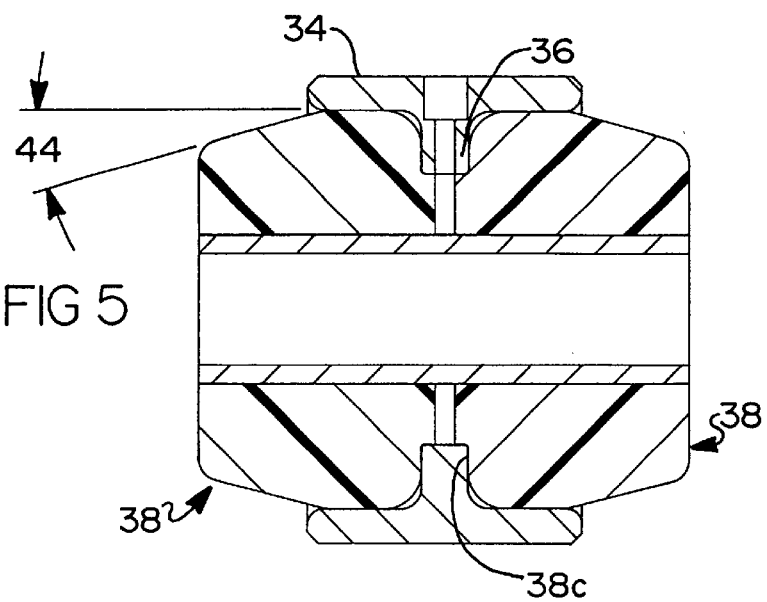
FIG. 5 is a cross-sectional view of one barrel including the two tapered cone bushings taken in accordance with section line 5—5 in FIG. 2, and further illustrating in cross section the sleeve shown in FIG. 2.

With reference to FIGS. 3 and 4, each bushing 38 includes a tapered portion 38b and a flat inside edge portion 38c. Referring to FIG. 5, the inside edge portion 38c of each bushing 38 abuts the internal ring 36 when the bushings 38 are assembled into the barrel 34. The degree of taper of the bushing 38 may vary considerably, but is preferably within about 10 degrees–30 degrees, as indicated by arrow 44 in FIG. 5. A taper within this range enables a good degree of articulation of the link 30. The bushing is preferably made from a compliant material, such as polyurethane, to further help facilitate a greater degree of torsional movement of the link 30 and to maintain ride quality. It will be appreciated, however, that other suitably compliant materials could be used to form the bushings 38.

It is a principal advantage of the present invention that the barrels 34 of the link 30 are narrower than with previous links. This allows greater articulation of the link 30 without the link being restricted by hitting the surfaces of the mounting brackets to which it is attached. Lateral movement of the link body portion 32 is controlled by virtue of the internal ring 36 which keeps the barrel portion 34 from moving side to side. The compliant bushings 38 also enable the OEM ride and feel of the vehicle's suspension system to be maintained and allows for a stronger body portion construction.

Figure 7:
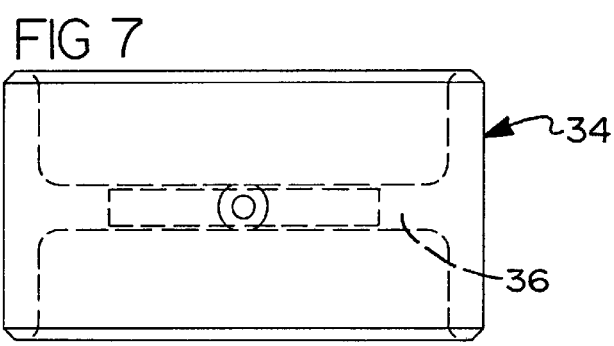
FIG. 7 is an end view of the barrel shown in FIG. 6.
Figure 6:
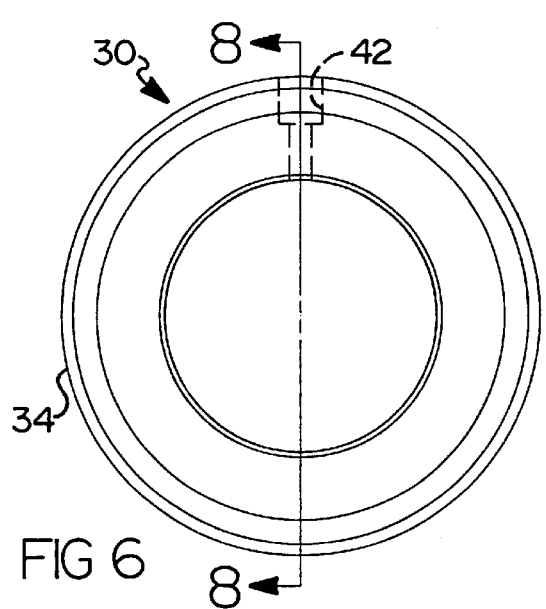
FIG. 6 is a side view of only the barrel portion of the link.
Figure 8:
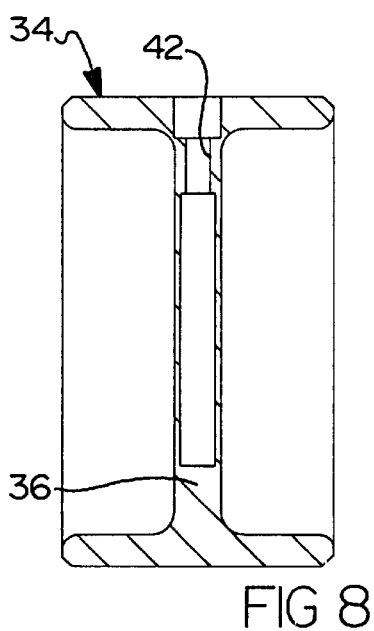
FIG. 8 is a cross-sectional view of the link in accordance with section line 8—8 in FIG. 6.

Referring now to FIGS. 6–8, the barrel portion 34 of the link 30 is shown in greater detail. Each barrel portion 30 includes an integrally formed grease fitting passage 42 which extends through the internal ring 36 to enable lubricant to be maintained within the barrel portion 34 when the tapered cone bushings 34 are assembled therein. The bushing may further include grease passages 38d on the bushing inner surface to allow controlled lubricant distribution to the bushing/sleeve interface.

The link assembly 30 of the present invention therefore enables a greater degree of articulation of a vehicle suspension system to be maintained without sacrificing the ride quality of the OEM suspension. The link body portion 32, being tubular, is stronger than the stamped steel construction which is typical of most OEM links. The link assembly 30 can be installed directly in place of the OEM components with no modification to the frame or mounting brackets of the vehicle. It will also be appreciated, however, that the link assembly 30 could be easily modified in to fit the suspension systems of a variety of different vehicles.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. For a motor vehicle suspension system, a suspension link for coupling inbetween a frame bracket mounted on a frame of a vehicle and an axle bracket mounted on an axle of the vehicle, wherein the suspension link permits increased twisting articulation of the link to improve suspension performance without substantially altering the ride and feel of the vehicle, said suspension link comprising:

an elongated link member having a barrel portion at each terminal end thereof each of said barrel portions defining an internal circumferential ring;

a lubricant passage defined by each of said internal circumferential rings;

at least one voidless resilient annular bushing disposed in each of said barrel portions, each of said bushings having a tapered, conical end of sufficient dimension to extend laterally outwardly of an edge of its associated barrel portion, and having a bore extending therethrough adapted to receive a bolt for securing said terminal end of said link member to one of said frame bracket or axle bracket;

a tubular sleeve extending through each of said bores; and a plurality of grease passages located between and defined by each of said sleeves and a respective bore, said plurality of grease passages being in communication with a respective lubricant passage.

2. The suspension link of claim 1, wherein each of said barrel portions includes a pair of said bushings with said tapered, conical end of each of said bushings disposed to project outwardly of said barrel portion.

3. The suspension link of claim 1, wherein each of said internal circumferential rings is disposed at a midpoint within an interior surface of each of said barrel portions; and wherein a pair of said bushings is disposed in each of said barrel portions on opposite sides of said internal circumferential ring, said bushings further being disposed such that said tapered conical end of each of said bushings projects outwardly in opposite directions from said barrel portion.

4. The suspension link of claim 1, wherein each of said bushings is comprised of polyurethane.

5. For a motor vehicle suspension system, a suspension link for coupling inbetween a frame bracket mounted on a frame of a vehicle and an axle bracket mounted on an axle of the vehicle, wherein the suspension link permits increased twisting articulation of the link to improve suspension performance without substantially altering the ride and feel of the vehicle, said suspension link comprising:

an elongated link member having a barrel portion at each terminal end thereof each of said barrel portions including an internal circumferential ring;

a lubricant passsage defined by each of said internal circumferential rings;

at least one voidless resilient annular bushing disposed in each of said barrel portions, each of said bushings having a tapered, conical end of sufficient dimension to extend laterally outwardly of an edge of its associated barrel portion, and having a bore extending therethrough adapted to receive a bolt for securing said terminal end of said link member to one of said frame bracket or said axle bracket, said tapered conical end of each said bushing extending outwardly beyond an edge portion of said barrel portion associated with said bushing; and a tubular sleeve extending through each of said bores; and a plurality of grease passages located between and defined by each of said sleeves and a respective bore, said plurality of grease passages being in communication with a respective lubricant passage.

6. The suspension link of claim 5, wherein each of said internal circumferential rings is disposed at a midpoint within an interior surface of each of said barrel portions for assisting in locating said bushing within said barrel portion.

7. The suspension link of claim 5, wherein each of said internal circumferential rings is disposed at a midpoint within an interior surface of said barrel portion for assisting in locating said bushing within said barrel portion; and wherein a pair of said bushings is disposed in each of said barrel portions on opposite sides of said internal circumferential ring, said bushings further being disposed such that said tapered conical end of each of said bushings projects outwardly in opposite directions from said barrel portion.

8. The suspension link of claim 5, wherein each of said bushings is comprised of polyurethane.

9. The suspension link of claim 5, wherein the degree of taper of said tapered, conical end of each of said bushings comprises a taper of between about 10 degrees to about 30 degrees.

10. For a motor vehicle suspension system, a suspension link for coupling inbetween a frame bracket mounted on a frame of a vehicle and an axle bracket mounted on an axle of the vehicle, wherein the suspension link permits increased twisting articulation of the link to improve suspension performance without substantially altering the ride and feel of the vehicle, said suspension link comprising:

an elongated link member having a barrel portion at each terminal end thereof;

each of said barrel portions including an integrally formed, internal, circumferential ring;

a lubricant passage defined by each of said internal circumferential rings;

at least one voidless resilient annular bushing disposed in each of said barrel portions of said terminal end portions, said internal circumferential ring assisting in locating said bushing within said barrel portion, each of said bushings having a tapered, conical end of sufficient dimension to extend laterally outwardly of an edge of its associated barrel portion, and having a bore extending therethrough adapted to receive a bolt for securing said terminal end of said link member to one of said frame bracket or said axle bracket, said tapered conical end of each said bushing extending outwardly beyond an edge portion of said barrel portion associated with said bushing and having a degree of taper between about 10–30 degrees;

a tubular sleeve extending through each of said bores; and a plurality of grease passages located between and defined by each of said sleeves and a respective bore, said plurality of grease passages being in communication with a respective lubricant passage.

11. The suspension link of claim 10, wherein each of said bushings is comprised of polyurethane.

* * * * *